United States Patent
Tatsuta et al.

(10) Patent No.: US 9,816,584 B2
(45) Date of Patent: Nov. 14, 2017

(54) MULTIJOINT CABLE PROTECTION AND GUIDE DEVICE

(75) Inventors: Kiyotake Tatsuta, Osaka (JP); Masaaki Ikeda, Osaka (JP); Shoichiro Komiya, Osaka (JP); Takayuki Matsuda, Osaka (JP)

(73) Assignee: TSUBAKIMOTO CHAIN CO., Tokyo (JP)

( * ) Notice: Subject to any disclaimer, the term of this patent is extended or adjusted under 35 U.S.C. 154(b) by 1013 days.

(21) Appl. No.: 12/953,418

(22) Filed: Nov. 23, 2010

(65) Prior Publication Data
US 2011/0121141 A1    May 26, 2011

(30) Foreign Application Priority Data
Nov. 26, 2009    (JP) .................... 2009-269012

(51) Int. Cl.
| F16L 3/00 | (2006.01) |
| F16G 13/16 | (2006.01) |
| F16G 13/20 | (2006.01) |
| H02G 11/00 | (2006.01) |
| E21F 17/02 | (2006.01) |
| H02G 3/04 | (2006.01) |
| H02G 3/00 | (2006.01) |
| H01B 7/00 | (2006.01) |

(52) U.S. Cl.
CPC ............. *F16G 13/16* (2013.01); *F16G 13/20* (2013.01); *H02G 11/006* (2013.01)

(58) Field of Classification Search
CPC ........ F16G 13/16; F16L 3/015; H02G 11/006; H02G 3/0475; H02G 11/00
USPC ..... 248/49, 70; 138/120, 110; 198/847, 850, 198/853; 174/68.1, 69, 70 R, 70 C, 71 R, 174/72 R, 72 TR
See application file for complete search history.

(56) References Cited

U.S. PATENT DOCUMENTS

| 7,174,702 B2 * | 2/2007 | Ikeda et al. .................... 59/78.1 |
| 7,576,283 B2 * | 8/2009 | Kadrnoska et al. ....... 174/21 JS |
| 2004/0112625 A1 * | 6/2004 | Sheikholeslami et al. .. 174/68.1 |

FOREIGN PATENT DOCUMENTS

| JP | 4157096 | 9/2008 |
| WO | 2004049509 | 6/2004 |

* cited by examiner

*Primary Examiner* — Kimberly Wood
*Assistant Examiner* — Erin W Smith
(74) *Attorney, Agent, or Firm* — Woodling, Krost and Rust (57) ABSTRACT

The invention provides a multijoint cable protection and guide device that steadily protects and guides cables and the like that assume flexed and straight postures. The device includes a flexible belt member in which a plurality of center tubular portions through which cables are inserted and a pair of right and left side tubular portions disposed in parallel along the center tubular portions. The center tubular portions and the pair of right and left side tubular portions are integrally molded. A pair of right and left multijoint supporting members is inserted through side tubular portions of the flexible belt member. The multijoint supporting member is composed of a large number of block bodies that are flexibly connected together by concave-convex fittings.

6 Claims, 8 Drawing Sheets

MULTIJOINT CABLE PROTECTION AND GUIDE DEVICE

CROSS REFERENCE TO RELATED APPLICATIONS

This application claims the foreign priority benefit under Title 35, United States Code, §119(a)-(d) of Japanese Patent Application No. 2009-269012, filed on Nov. 26, 2009 in the Japan Patent Office, the disclosure of which is herein incorporated by reference in its entirety.

BACKGROUND OF THE INVENTION

Field of the Invention

The present invention relates to a cable protection and guide device used for working machines, electronic devices, industrial robots, transportation equipment and the like. The invention is used to protect and guide flexible cables and hoses such as electrical cables, optical fiber cables, and fluid supplying hoses for feeding electricity, fluid, and air to such mobile machine or to a mobile section of the machine.

Related Art

When the cables are connected to a mobile object of a working machine, a civil-engineering machine, or a conveying device, the cables are twisted or tensioned unnaturally as the mobile object moves. The cables then become damaged and theft appearance becomes formless. The cable protection and guide device is used to protect and guide those cables that otherwise become formless.

Japanese Patent No. 4157096 (Claims, Paragraph [0031] through [0034], FIG. 21) discloses a known prior art cable protection and guide device. In this prior art device, conduit best for transferring conductors, gases and the like are sealed within a plurality of channels together with supporting members composed of continuous material strips and are disposed in parallel. The continuous material strips have a series of non-interlocking motion-limiting solids.

PROBLEMS TO BE SOLVED BY THE INVENTION

Because a flexible member composing the supporting member is a stainless steel member or a leaf spring, the prior art cable protection and guide device is unable to hold a stable flexion radius and the flexion radius becomes too large when the device is bent. It then becomes difficult to arrange the device within a predetermined space because the device may encounter an obstacle located in a nearby position. There is also a problem when the stainless steel member is used as the flexible member. That is, the flexible member may break down and become useless from fatigue when used for a long period time.

The prior art device also has a problem because the flexible member composing the supporting member is the stainless steel member, or the leaf spring, which cannot be easily cut and connected. The supporting member cannot be replaced with a new and different one to prolong it, thus, the supporting member is wasted. Further, because the torsional rigidity of the flexible member is low, the flexible member resonates. As a result, operations of assuming flexed and straight postures may become unstable.

Furthermore, pieces of the prior art cable protection and guide device are made of resin by injection-molding one at a time in connection with the stainless steel member or the leaf spring. This process requires a lot of time and labor and makes mass production difficult.

SUMMARY OF THE INVENTION

Accordingly, the present invention aims at solving the aforementioned prior art problems by providing a multijoint cable protection and guide device that steadily protects and guides cables that assume flexed and straight postures.

Means for Solving the Problems

A first aspect of the multijoint cable protection and guide device of the invention includes a flexible belt member. The flexible belt member includes a plurality of center tubular portions through which cables and the like are respectively inserted. A pair of right and left side tubular portions is disposed in parallel along the center tubular portions which are integrally molded.

A pair of right and left multijoint supporting members is inserted through the side tubular portions of the flexible belt member to guide the cables. The cables and the like are protected within the center tubular portions while assuming straight and flexed postures.

The multijoint supporting members are composed of a large number of block bodies flexibly connected to each other. The multijoint supporting members fit together in a concave-convex snap-fitting arrangement.

A second aspect of the multijoint cable protection and guide device of the invention aims at solving the aforementioned problems by providing block bodies flexibly connected to each other with concave-convex snap-fitting of connecting pins. The pins provided in the front side portion of the block bodies are connected with pin holes provided in the rear side portion of preceding block bodies. The front side portion of each of the block bodies includes front side surfaces and the rear side portion of each of the block bodies includes rear side surfaces.

A third aspect of the multijoint cable protection and guide device of the invention aims at solving the aforementioned problems by providing each block with a tapered cutaway fitting portion. This tapered cutaway fitting portion extends continuously from the connecting pin hole in the rear portion of the block body to the rear side surfaces of the block body. The tapered cutaway fitting allows insertion of the pin from the subsequent block body.

A fourth aspect of the multijoint cable protection and guide device of the invention aims at solving the aforementioned problems by providing each block body with straight posture holding planes and flexed posture holding planes.

A fifth aspect of the multijoint cable protection and guide device of the invention aims at solving the aforementioned problems by providing a flexible belt member molded from synthetic resin material.

A sixth aspect of the multijoint cable protection and guide device of the invention aims at solving the aforementioned problems by providing the flexible belt member having a stretchable layer whose front and back surfaces are laminated by fluorine resin layers.

A seventh aspect of the multijoint cable protection and guide device of the invention aims at solving the aforementioned problems by molding the multijoint supporting member out of a synthetic resin material.

An eighth aspect of the multijoint cable protection and guide device of the invention aims at solving the aforementioned problems by molding the multijoint supporting member out of glass fiber-reinforced polyamide 66 resin.

A ninth aspect of the multijoint cable protection and guide device of the invention aims at solving the aforementioned problems by making each block body, in cross-section, rectangulary shaped. Additionally, the four corners are chamfered along the longitudinal direction.

Advantageous Effects of the Invention

The multijoint cable protection and guide device of the invention is composed of the flexible belt member in which the plurality of center tubular portions through which cables and the like are respectively inserted and the pair of right and left side tubular portions disposed in parallel adjacent the center tubular portions are integrally molded. The device is also composed of the pair of right and left multijoint supporting members respectively inserted through the side tubular portions of the flexible belt member. Accordingly, the multijoint cable protection and guide device can guide the cables and the like protected within the center tubular portions while assuming the straight and flexed postures of the multijoint supporting members and has the following peculiar advantageous effects.

A first advantageous effect obtained by the multijoint supporting member composed of the large number of block bodies that are flexibly connected with each other is the avoidance of injection molding the pieces one by one with respect to a stainless steel member or a leaf spring as is done in the prior art. Accordingly, it is easy to cut and connect the multijoint supporting member. Comparatively, the prior art flexible member, composed of a supporting member, such as a stainless steel material, is difficult to cut and connect to steadily protect and guide cables that assume flexed and straight postures. Because the large numbers of block bodies are flexibly connected together by concave-convex snap-fitting, it remarkably reduces the burden of managing parts. Comparatively, in the prior art, various long and short supporting members are required, thus requiring more parts and more work to manage a larger number of parts.

A second advantageous effect is that the multijoint supporting member smoothly shifts from straight posture to flexed posture and vice versa. This is because the block bodies are flexibly connected by the concave-convex snap-fitting. The connecting pins provided in the front side portion of the block bodies interengage the connecting pin holes provided in the rear side portions of a preceding block body. The connecting pins of the succeeding block body are rotatably and axially supported by the connecting pin holes of the preceding block body. Accordingly, it becomes possible to smoothly guide the cables and the like by use of the invention.

A third advantageous effect is the ability to cut and connect the multi-joint member corresponding to its usage. The block body is concavely provided with tapered cutaway fitting portions. The tapered cutaway fitting portions extend continuously from the connecting pin holes in the rear side regions/portions to the rear side surface and enable the concave-convex fitting of the connecting pins in the front side regions/portion with the connecting pin holes in the rear side regions/portion. The connecting pins of a succeeding block body are attached to the connecting pin holes through the tapered cutaway fitting portions of the preceding block body without requiring an excessive fitting force in connecting the block bodies of the multijoint supporting member together.

A fourth advantageous effect is the protection and guidance of the cables and the like that assume flexed and straight postures even if the device is installed in a space close to an obstacle. Each block body is provided with the straight posture holding planes for keeping the block bodies in a straight state. Each block body is also provided with the flexed posture holding planes/surfaces for holding the block bodies in a flexed state. As a result, the straight posture holding planes and the flexed posture holding planes butt respectively with each other and position to hold the straight and flexed postures required for the multijoint supporting member.

A fifth advantageous effect is that because the flexible belt member is molded from synthetic resin material, it becomes easy to work and mold configurations of the plurality of center tubular portions and the pair of right and left side tubular portions that compose the light-weight flexible belt member corresponds to the shape of the cables and the like. Because the synthetic resin material of the flexible belt member has self-lubricating nature, it reduces sliding abrasion that is otherwise prone to be caused between the flexible belt member and the cables.

A sixth advantageous effect is that the device can protect and smoothly guide the cables without resistance even though the cables assume flexed and straight postures. Because the flexible belt member is molded by laminating the fluorine resin layers on both front and back surfaces of the stretchable layer, the stretchable layer exhibits stretching properties and the fluorine resin layer exhibits sliding properties.

A seventh advantageous effect is a considerable power reduction in the operation of the device because the flexible belt member is a synthetic resin material which has self-lubricating nature. Thus, friction is reduced and energy is saved. Additionally, the block bodies connected with each other centering on the axially supporting portion of the connecting pin and the connecting pin hole are easier to rotate with respect to each other thus reducing friction. Because the synthetic resin is used, the connecting pin holes in the rear side regions, the cutaway fitting portions for concave-convexly fitting the connecting pins, the straight posture holding planes for holding the straight state, the flexed posture holding planes for holding the flexed state and others composing the block body all have self-lubricating nature and may be easily fabricated and assembled. Accordingly, it is easy to manufacture the light-weight block bodies that may be cut and connected as necessary.

An eighth advantageous effect is improved rigidity and wear resistance because glass fiber-reinforced polyamide 66 resin is used. Accordingly, the multijoint supporting member can fully sustain even long-term, repetitive use, and can achieve a long life. Comparatively, the prior art supporting member is made of the stainless steel material, prone to cause failure from fatigue, and is destroyed when used flectionally and repetitively.

A ninth advantageous effect is that because the block bodies are rectangularly shaped in cross-section and because the four corners of the block bodies are chamfered along the longitudinal direction, the four corners of the block body are not jammed or stuck within the side tubular portion, even if the block body is displaced relatively in the vertical and horizontal directions within the side tubular portion of the flexible belt member.

Accordingly, the large number of block bodies connected with each other may assume flexed and straight postures within the side tubular portions of the flexible belt member.

DESCRIPTION OF THE INVENTION

A specific mode of a multijoint cable protection and guide device of the present invention may assume any mode as long as the multijoint cable protection and guide device is composed of a flexible belt member. The flexible belt member contains a plurality of center tubular portions through which cables and the like are respectively inserted. An integrally molded pair of right and left side tubular portions is disposed in parallel along the center tubular portions. A pair of right and left multijoint supporting members is respectively inserted through side tubular portions of the flexible belt member to guide the cables protected within the center tubular portions while assuming straight and flexed postures by the multijoint supporting members. The multijoint supporting member is composed of a large number of block bodies. Each block body is flexibly connected to adjacent block bodies using concave-convex fittings. The device has a smaller number of parts and can be cut and connected corresponding to its usage.

The flexible belt member used in the device of the invention may be any member as long as it includes a plurality of center tubular portions through which the cables and the like are respectively inserted. The pair of right and left side tubular portions is disposed in parallel along the center tubular portions. The flexible belt member and the plurality of center tubular portions are integrally molded. Another example of the flexible belt member comprises two sheets laminated together forming a plurality of tubular spaces bulged to the front and back sides between the sheets in parallel.

Further, the specific configuration of the center tubular portions and the side tubular portions described above may be either circular in cross-section or rectangular in cross-section. There may be at least one center tubular portion. It is possible for the cables and the like to avoid contact with each other if there is a number of tubes into which the cables and the like may be inserted.

The material of the flexible belt member may be comprised of any synthetic resin materials, as long as it can form the plurality of center tubular portions and the pair of right and left side tubular portions. If the flexible belt member uses fluorine resin layers laminated on both front and back surfaces of a stretchable layer, the flexible belt must exhibit stretchability and must exhibit lubricity. In other words, the stretchable layer exhibits stretching properties and the fluorine resin layer exhibits sliding properties. It is preferable to use PTFE (polytetrafuluoroethylene) for the fluorine resin layer of the flexible belt member because it exhibits low wear and relatively strong rigidity. In the case that the flexible belt member is manufactured by laminating two sheets, the shape of the sheet may be freely altered by a repetitively usable tool so that the plurality of center and side tubular portions may be formed simultaneously. This method of manufacture can also minimize sheet debris and can lower the cost of a product.

Further, this method allows the width of the plurality of center tubular portions and the side tubular portions to be appropriately designed to be equal or different when laminating the two sheets as the flexible belt member. In addition, this method allows a thickness of the plurality of center tubular portions, or the side tubular portions to be appropriately designed to be equal or different in a similar manner. Polyurethane resin may be used as the material of the stretchable layer.

Further, the multijoint supporting member used in the multijoint cable protection and guide device of the invention may have any specific configuration as long as it is composed of a large number of block bodies flexibly connected together by concave-convex snap-fittings. Connecting pins provided in the front side surface regions of the block bodies connect with connecting pin holes provided in the rear side surface regions of the preceding block bodies. Additionally, the block bodies can be flexibly connected by concave-convex fittings, the connecting pins provided in the rear side regions of the block bodies and connected with pin holes provided in the front side regions of succeeding block bodies. However, the former is most preferable.

The material of h bock bodies composing the multijoint supporting member may be any material as long as the synthetic resin material can hold the connecting pins in the front side regions, the connecting pin holes in the rear side surface regions, the cutaway fitting portions for the concave-convex fitting the connecting pins, the straight posture holding planes/surfaces for holding the straight state, the flexed posture holding planes/surfaces for holding the flexed state, and others. Glass fiber-reinforced polyamide 66 resin, polyacetal resin and ABS resin are preferable. When the glass fiber-reinforced polyamide 66 resin is used, the rigidity and wear resistance of the multijoint supporting member are improved. As a result, the multijoint supporting member can achieve a long life and fully sustain long-term, repetitive use.

Embodiment

Figure 1:
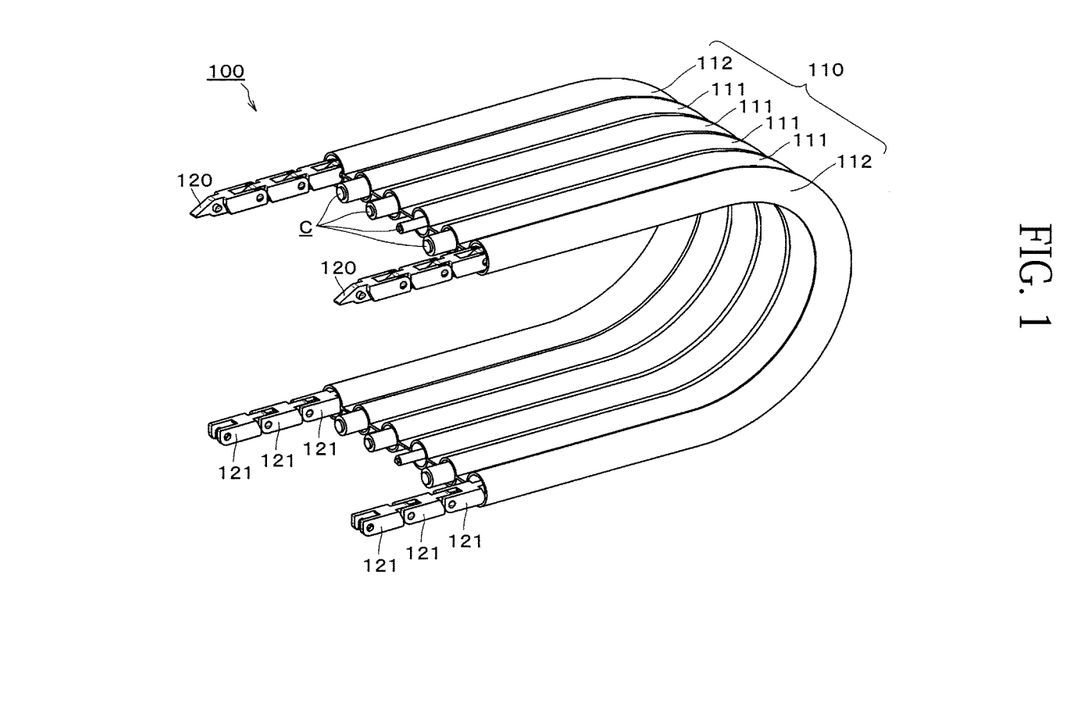
FIG. 1 shows an outline of a multijoint cable protection and guide device according to one embodiment of the invention.
Figure 2:
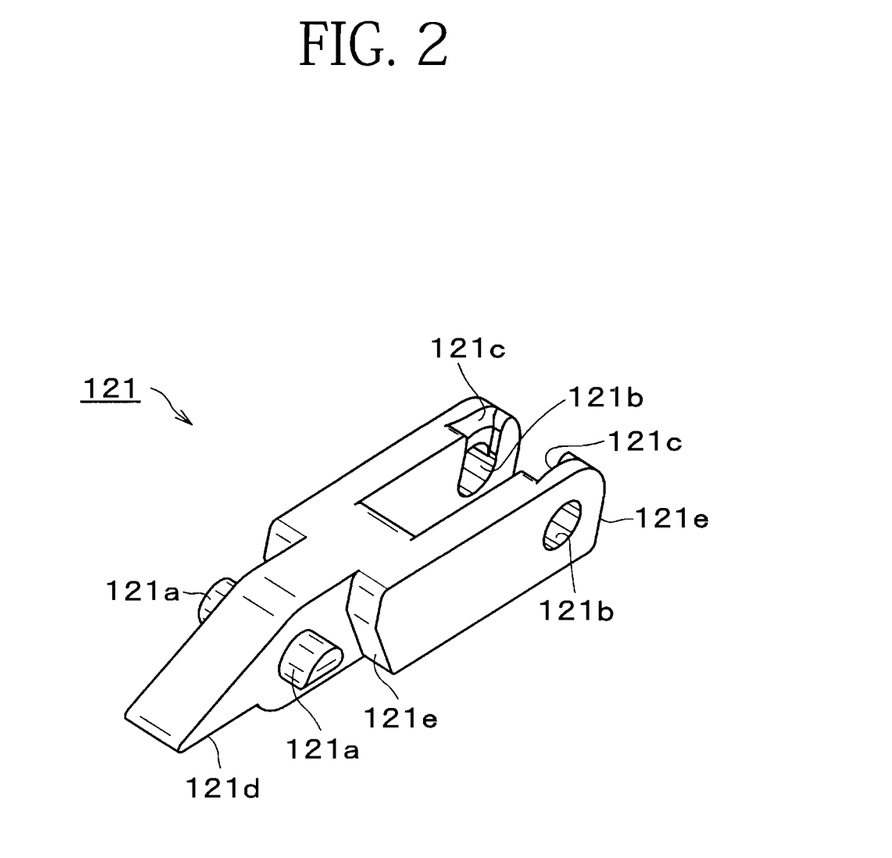
FIG. 2 is a perspective view of a block body shown in FIG. 1 seen from the obliquely front upper side thereof.
Figure 3:
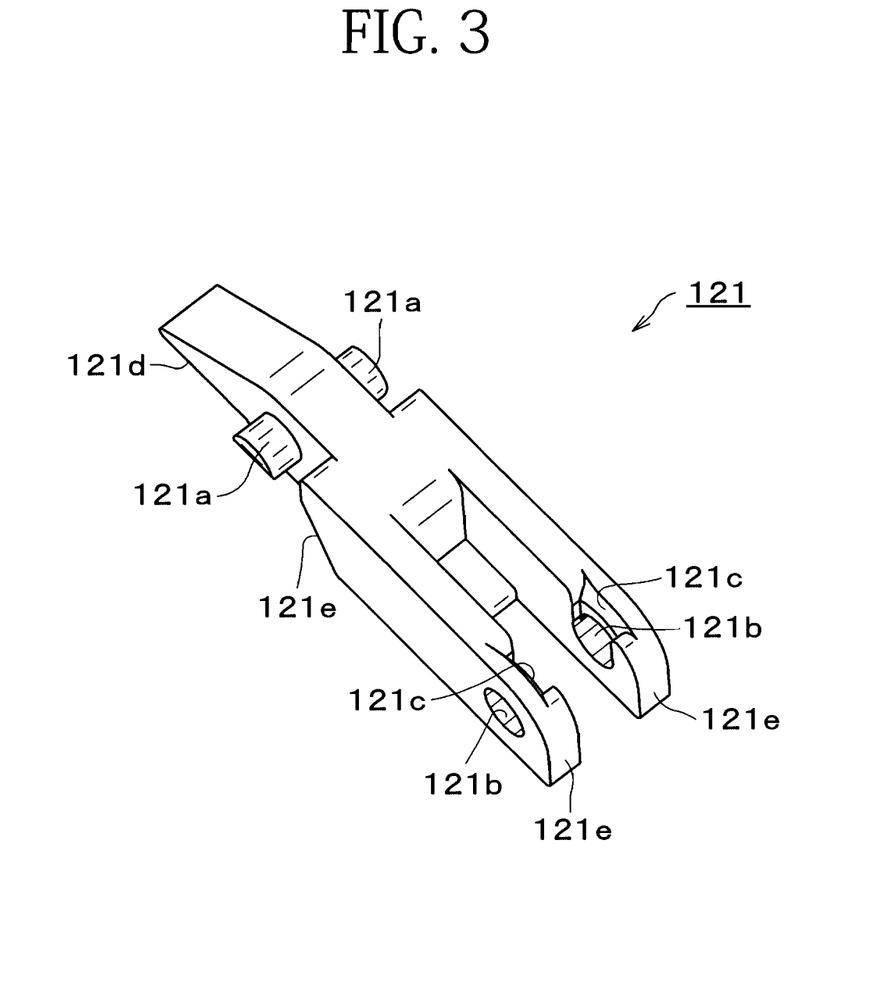
FIG. 3 is a perspective view of the block body shown in FIG. 1 seen from the obliquely rear upper side thereof.
Figure 4:
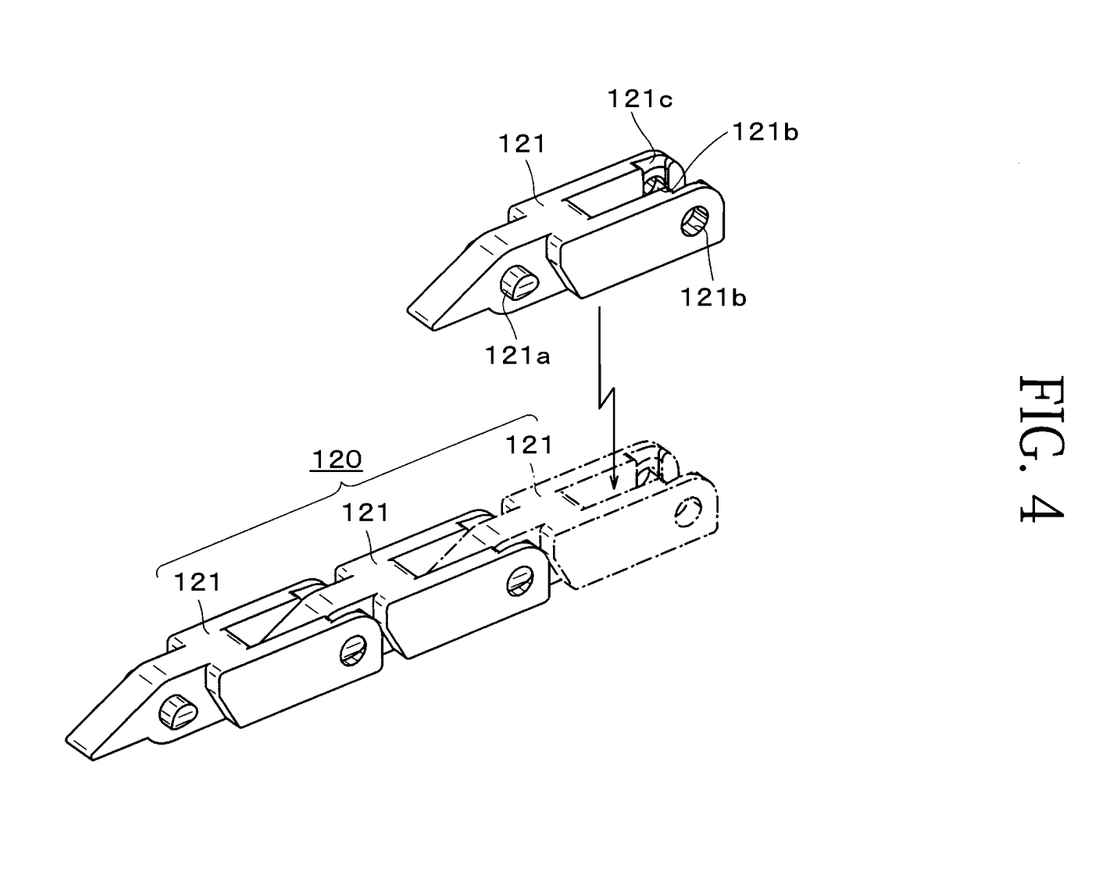
FIG. 4 is an assembly exploded view of a multijoint supporting member shown in FIG. 1.
Figure 5:
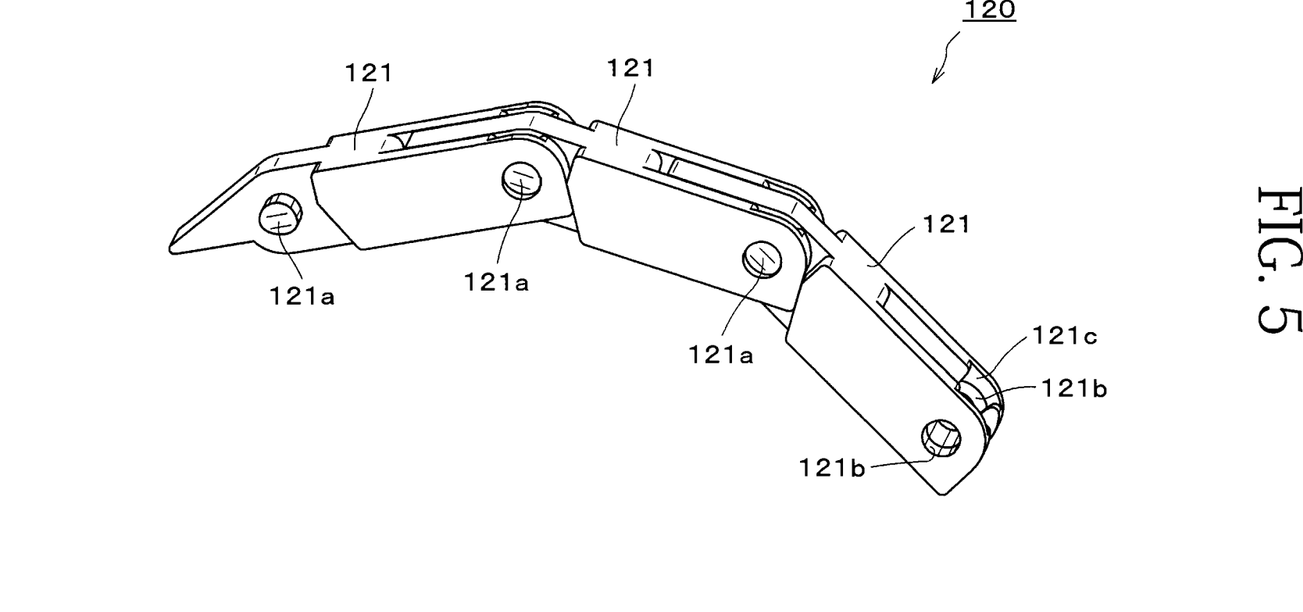
FIG. 5 illustrates a flexed state of the multijoint supporting member shown in FIG. 1.
Figure 6:
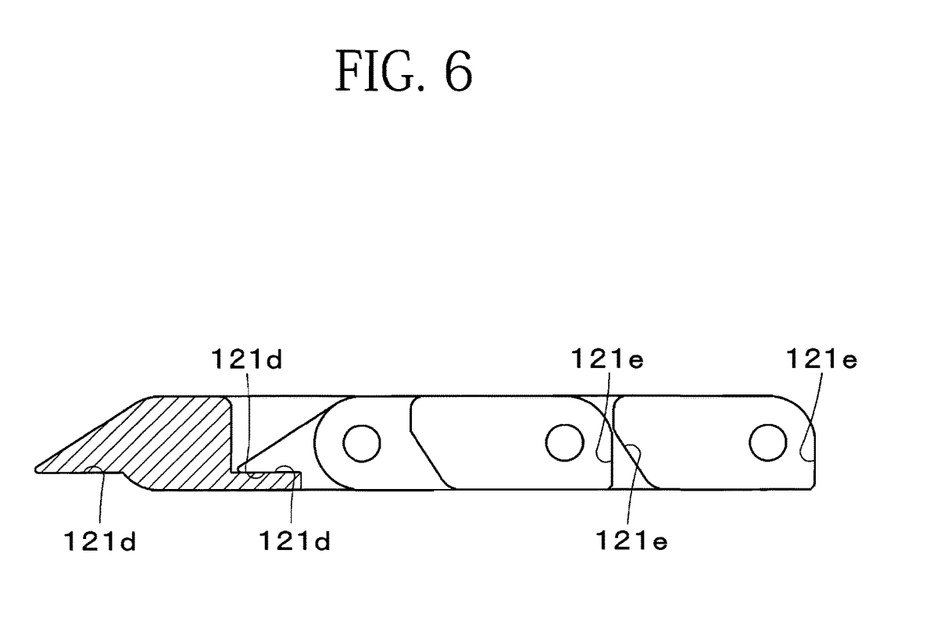
FIG. 6 is a side view of the multijoint supporting member showing a straight state thereof.
Figure 7:
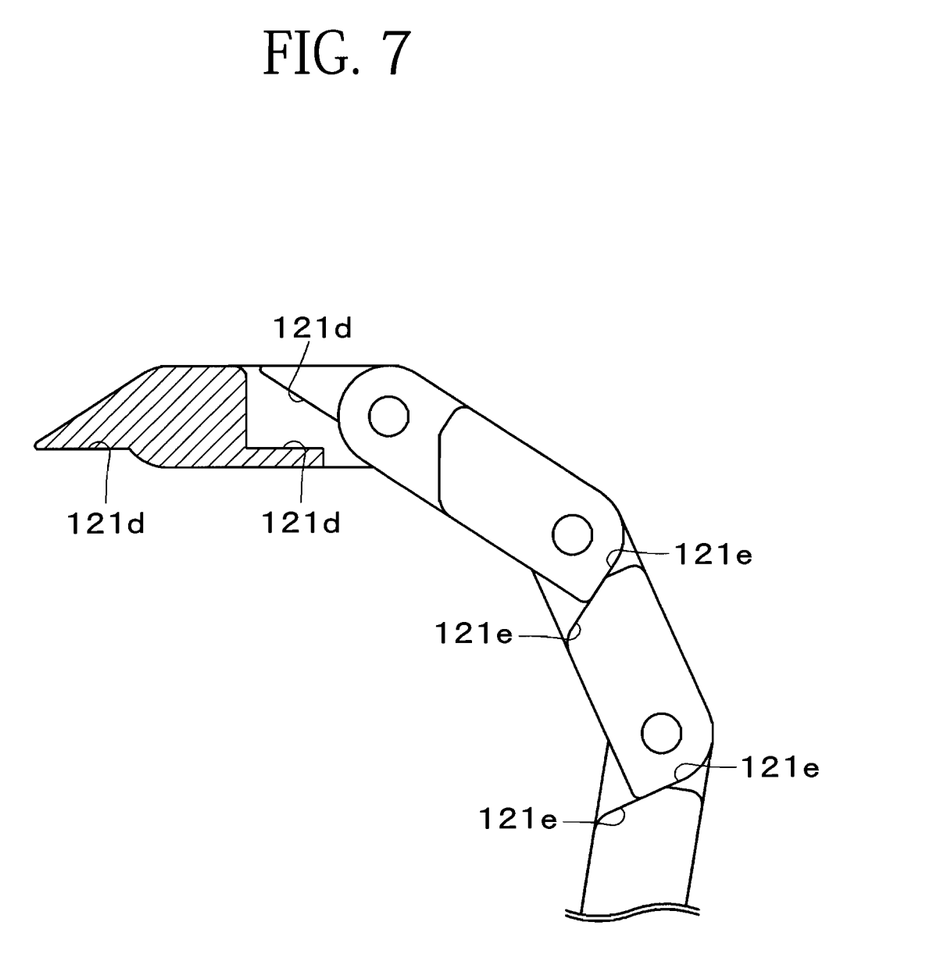
FIG. 7 is a partially sectional side view of the multijoint supporting member showing a flexed state thereof and FIG. 8 is a partially sectional side view the flexible belt member.

An embodiment of a multijoint cable protection and guide device of the invention will be explained with reference to the drawings. FIG. 1 shows an outline of one embodiment of the multijoint cable protection and guide device of the invention. FIG. 2 is a perspective view of a block body, shown in FIG. 1, and seen from the obliquely front upper side thereof. FIG. 3 is a perspective view of the block body shown in FIG. 1 seen from the obliquely rear upper side thereof. FIG. 4 is an assembly exploded view of a multijoint supporting member shown in FIG. 1. FIG. 5 illustrates a flexed state of the multijoint supporting member shown in FIG. 1. FIG. 6 is a side view of the multijoint supporting member showing a straight state thereof. FIG. 7 is a partially sectional side view of the multijoint supporting member showing a flexed state thereof.

One embodiment of the multijoint cable protection and guide device (100) of the invention is used for working machines, electronic devices, industrial robots, transportation equipment and the like to protect and guide flexible cables and hoses (hereinafter referred to as "cables and the like C"). For example, electrical cables, optical fiber cables, and fluid supplying hoses are used for feeding electricity, fluid, and air to such moving machines, or to a moving section of the machines.

As shown in FIG. 1, the multijoint cable protection and guide device (100) of the present embodiment is composed of a flexible belt member (110) in which four center tubular portions (111) through which cables (C) are respectively inserted and a pair of right and left side tubular portions (112) is disposed in parallel along the center tubular portions (111). The center tubular portions (111) are integrally molded with the pair of right and left side tubular portions (112).

A pair of right and left multijoint supporting members (120) is inserted through side tubular portions (112) of the flexible belt member (110).

Thereby, the multijoint cable protection and guide device guides the cables and the like (C) protected within the center tubular portions (111) described above while assuming straight and flexed postures by the pair of right and left multijoint supporting members (120).

Figure 8:
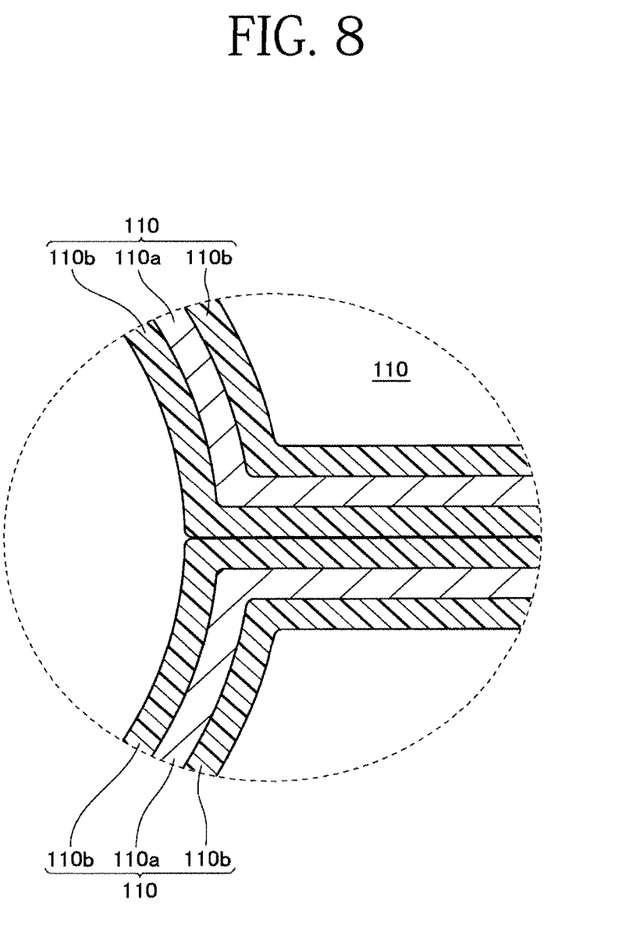

The flexible belt member (110) described above is integrally molded by using two sheets not shown. As shown in FIG. 8, each sheet includes a polyurethane layer (110a). Each sheet includes fluorine resin layers (110b) laminated on both sides of the polyurethane layer (110a). The four center tubular portions (111) and the pair of right and left side tubular portions (112) disposed in parallel along the center tubular portions 111 are bulged (opened) to the front and back sides to integrally mold tubular portions. Thereby, the flexible belt member (110) exhibits stretching properties from the polyurethane resin layer (110a), and exhibits sliding properties from the self-lubricant nature of the fluorine resin layers (110b) that protects the cables and the like (C) with less resistance.

The multijoint supporting member (20) described above is composed of a large number of block bodies (121). These are flexibly connected together by using concave-convex fittings as shown in FIGS. 1 through 4.

A specific configuration of the block body (121), which is the most characteristic part of the multijoint cable protection and guide device (100) of the present embodiment, will be detailed with reference to FIGS. 2 through 7.

That is, as shown in FIGS. 2 and 3, the block body (121) described above is provided with a pair of right and left connecting pins (121a) in the front side surface regions thereof, and a pair of right and left connecting pin holes (121b) in the rear side surface regions. The connecting pins (121a) of the block body (121) are concave-convex snap-fitted into the connecting pin holes (121b) provided on the rear side surface regions of a preceding block body (121) and are rotatably and axially supported thereby. Thus, both block bodies (121) are flexibly connected with each other.

The block body (121) is also provided with a tapered cutaway fitting portion (121c) extending continuously from the connecting pin hole (121b) to the rear side surface. The connecting pin hole (121b) receives the connecting pin (121a) in a manner of snap-fit.

Thereby, as shown in FIG. 4, the connecting pin (121a) of a succeeding block body (121) may be attached to the connecting pin hole (121b) through the cutaway fitting portion (121c) of the preceding block body (121) without requiring an excessive fitting force to connect the block bodies (121) of the multijoint supporting member (120). That is, cutting and connecting of the multijoint supporting member (120) may be easily achieved corresponding to its usage.

As shown in FIGS. 2 through 7, the block body (121) is also provided with straight posture holding planes (121d). The straight posture holding planes is located at different front side positions thereof to position the preceding and succeeding block bodies (121) and to hold them in a straight state by vertically butting them together.

The block body (121) is also provided with flexed posture holding planes (121e) at different rear positions thereof to position the preceding and succeeding block bodies (121) and to hold them in a flexed state by butting them together in a front-back direction to hold them.

Thereby, referring to adjacent block bodies, the straight posture holding plane (121d) butt each other, and the flexed posture holding planes (121e) butt each other, positioning and holding the straight and flexed postures, respectively, required for the multijoint supporting member (120). Even if the device (100) is installed in a space close to an obstacle, the device steadily protects and guides the cables and the like (C) that assume the straight posture shown in FIG. 4 or 6, and that assume the flexed posture shown in FIG. 5 or 7.

It is noted that although not shown, the block body (121) described above has a rectangular cross-section whose four corners are chamfered longitudinally. Thereby, the block body (121) is not caught within the side tubular portion (112) by the four corners even if the block body (121) is displaced relatively in the vertical and horizontal directions within the side tubular portion (112) of the flexible belt member (110). Then, the large number of connected block bodies (121) assume the flexed and straight postures smoothly within the side tubular portion (112) of the flexible belt member (110).

All of the block bodies (121) comprising the multijoint supporting member (120) used in the multijoint cable protection and guide device (100) of the present embodiment are molded by glass fiber-reinforced polyamide 66 resin. The multijoint supporting member made from this material facilitates fabrication and reduces labor costs. Further, the multipoint supporting member made from glass fiber-reinforce polyamide 66 resin enables easy molding of:
the connecting pins (121a) in the front side surface region,
the connecting pin holes (121b) in the front side surface region,
the cutaway fitting portions (121c) for the concave-convex fitting of the connecting pins (121a),
the straight posture holding planes (121d) for holding the straight state,
the flexed posture holding planes (121e) for holding the flexed state and others composing the block body (121).

In addition, it is easier to manufacture the light-weight block body (121) from a material that can be cut and connected corresponding to its usage. The self-lubricating nature of the glass fiber-reinforced polyamide 66 resin enables smooth turning of the axially supported connecting pin (121a) within the connecting pin hole (121b). This considerably reduces the power required to shift between the flexed and straight postures.

The device can guide the cables and the like (C) protected within the center tubular portions (111) while assuming the straight and flexed postures by the multijoint supporting members (120). This is because the multijoint cable protection and guide device (100) of the present embodiment obtained is composed of the flexible belt member (110). The four center tubular portions (111) through which cables (C) are respectively inserted, and the pair of right and left side tubular portions (112) disposed in parallel along the center tubular portions (111) are integrally molded. The pair of right and left multijoint supporting members (120) is respectively inserted through side tubular portions (112) of the flexible belt member (110), The advantageous effects of the multijoint cable protection and guide device of the invention are remarkable. The multijoint supporting member (120) is composed of the large number of block bodies (121) that are flexibly connected together by snap fittings, thus, as compared to the prior art flexible member, it becomes possible to easily cut and connect the multijoint supporting member (120) corresponding to its usage. For example, the conventional device using stainless steel material is difficult to cut and connect and is also difficult to steadily protect and guide the cables and the like (C) that assume the flexed and straight postures. The present device also remarkably reduces the burden of managing parts as compared to the prior art supporting members that require various long and short members corresponding to its usage.

DESCRIPTION OF REFERENCE NUMERALS 100 multijoint cable protection and guide device
110 flexible belt member
111 center tubular portion
112 side tubular portion
120 multijoint supporting member
121 block body
121a connecting pin
121b connecting pin hole
121c tapered cutaway fitting portion
121d straight posture holding plane
121e flexed posture holding plane
C cables and the like C

What is claimed is:

1. A multijoint cable protection and guide device, comprising:
    a flexible belt member;
    said flexible belt member includes a plurality of center tubular portions;
    said flexible belt member includes a pair of right and left side tubular portions;
    said right and left side tubular portions reside adjacent to and in parallel with said plurality of said center tubular portions;
    said center tubular portions being integral with said pair of right and left side tubular portions;
    cables are inserted respectively through said center tubular portions of said flexible belt member;
    right and left multijoint supporting members;
    said right multijoint supporting member resides in said right side tubular portion;
    said left multijoint supporting member resides in said left side tubular portion;
    said right and left multijoint supporting members include a plurality of block bodies;
    each of said block bodies includes a front side and a rear side;
    said front side of each of said block bodies includes first and second convex portions to flexibly connect one block body to a succeeding block body, said first convex portion is a first connecting pin and said second convex portion is a second connecting pin;
    said rear side of each of said block bodies includes first and second concave portions to flexibly connect one block body to a preceding block body, said first concave portion is a first connecting pin hole and said second concave portion is a second connecting pin hole;
    said rear side of each of said block bodies defines a slotted portion configured to receive said front side of a succeeding block body such that said block bodies are flexibly connected to succeeding and preceding block bodies by concave-convex snap-fittings of said first connecting pin and said first connecting pin holes and concave-convex snap-fittings of said second connecting pin and said second connecting pin holes so that said right and left multijoint supporting members guide said cables residing in said center tubular portions, between straight and flexed postures;
    said front side of each of said block bodies includes a first straight posture holding plane located at a bottom of said front side;
    said rear side of each of said block bodies includes a second straight posture holding plane located inside of said slotted portion of said rear side;
    said first and second straight posture holding planes are configured to position preceding and succeeding block bodies and to hold them in a straight state by vertically butting together; and,
    each of said block bodies includes a solid portion blocking said slotted portion to receive a force applied between said first and second straight posture holding planes.

2. The multijoint cable protection and guide device according to claim 1,
    wherein said flexible belt member having a stretchable layer whose front and back surfaces are laminated by fluorine resin layers.

3. The multijoint cable protection and guide device according to claim 1, wherein
    said rear side of each of said block bodies includes a first tapered cutaway portion in communication with said first connecting pin hole and said rear side of each of said block bodies includes a second tapered cutaway portion in communication with said second connecting pin hole, and,
    said first and second connecting pins of said front side of each of said block bodies slidably engage said first and second tapered cutaway portions in communication with said first and second connecting pin holes of said rear side of an adjacent block body, respectively, such that said first and second connecting pins of said front side of one block body respectively engage and reside in said first and second connecting pin holes of a preceding block body.

4. The multijoint cable protection and guide device according to claim 3, wherein:
    said rear side of each of said block bodies includes a first side surface defining said slotted portion, wherein said first connecting pin hole is formed in said first side surface,
    said rear side of each of said block bodies includes a second side surface defining said slotted portion, wherein said second connecting pin hole is formed in said second side surface, and,
    said first and second tapered cutaway portions continuously extend from said first and second connecting pin holes to said first and second rear side surfaces, respectively.

5. The multijoint cable protection and guide device according to claim 1, wherein:

each of said block bodies includes an exterior surface, and, said exterior surface of said block bodies includes first and second flexed posture holding planes for holding said block bodies in a flexed state.

6. The multijoint cable protection and guide device according to claim 4, wherein:

each of said block bodies includes an exterior surface, and, said exterior surface of said block bodies includes first and second flexed posture holding planes for holding said block bodies in a flexed state.

* * * * *

UNITED STATES PATENT AND TRADEMARK OFFICE
CERTIFICATE OF CORRECTION

PATENT NO. : 9,816,584 B2  
APPLICATION NO. : 12/953418  
DATED : November 14, 2017  
INVENTOR(S) : Tatsuta et al.

Page 1 of 1

It is certified that error appears in the above-identified patent and that said Letters Patent is hereby corrected as shown below:

In the Specification

Column 1, Line 29, after "and" delete "theft" and insert --their-- therefor.

Column 1, Line 34, after "conduit" delete "best" and insert --tubes-- therefor.

Column 5, Line 13, after "view" insert --of--.

Column 6, Line 28, after "material of" delete "h" and insert --the-- therefor.

Column 7, Line 36, after "member" delete "(20)" and insert --(120)-- therefor.

Signed and Sealed this  
Twenty-third Day of January, 2018

Joseph Matal  
*Performing the Functions and Duties of the  
Under Secretary of Commerce for Intellectual Property and  
Director of the United States Patent and Trademark Office*